United States Patent [19]

Brown

[11] Patent Number: 5,018,251
[45] Date of Patent: May 28, 1991

[54] CABLE ANCHORAGE

[75] Inventor: Charles J. Brown, Harlow, England

[73] Assignee: STC PLC, London, England

[21] Appl. No.: 434,796

[22] Filed: Nov. 9, 1989

[30] Foreign Application Priority Data

Nov. 10, 1988 [GB] United Kingdom ............... 8826313

[51] Int. Cl.[5] ............................................. H02G 15/02
[52] U.S. Cl. .................. 24/122.6; 24/136 R;
  24/136 B; 403/275
[58] Field of Search ............... 248/548, 49, 74.1, 74.4,
  248/316.2, 316.3; 403/275, 367; 174/655.5, 65
  R, 74 R, 151; 24/122.6, 122.3, 136 R, 136 L,
  136 B, 115 M

[56] References Cited

U.S. PATENT DOCUMENTS

| | | | |
|---|---|---|---|
| 3,229,341 | 1/1966 | Maras | 403/275 |
| 3,309,744 | 3/1967 | Sironi | 24/122.6 |
| 3,475,795 | 11/1969 | Youngblood | 24/122.6 |
| 4,117,256 | 9/1978 | Williams | 24/131 R |
| 4,189,620 | 2/1980 | Stange | 403/275 |
| 4,217,464 | 8/1980 | Oldham | 174/79 |
| 4,367,568 | 1/1983 | Weiser | 403/367 |
| 4,507,008 | 3/1985 | Adl | 24/122.6 |

FOREIGN PATENT DOCUMENTS

| | | | |
|---|---|---|---|
| 132208 | 1/1985 | European Pat. Off. | 24/136 R |
| 2615927 | 10/1976 | Fed. Rep. of Germany | 403/275 |

Primary Examiner—Ramon O. Ramirez
Assistant Examiner—Robert A. Olson
Attorney, Agent, or Firm—Lee, Mann, Smith, McWilliams & Sweeney

[57] ABSTRACT

A cable anchorage for anchoring a submarine cable wire strength member comprises conically tapered parts (2,4,5), at least one of which has a surface (2C, 4B), roughened by tungsten carbine grit evenly distributed over and firmly bonded to the surface, prior to assembly of the parts of the anchorage. The grit size is chosen so that a sufficient locking mechanism is achieved but the grit indentations in the wire strength member are not deep enough to weaken the wires (3B, 3C).

11 Claims, 1 Drawing Sheet

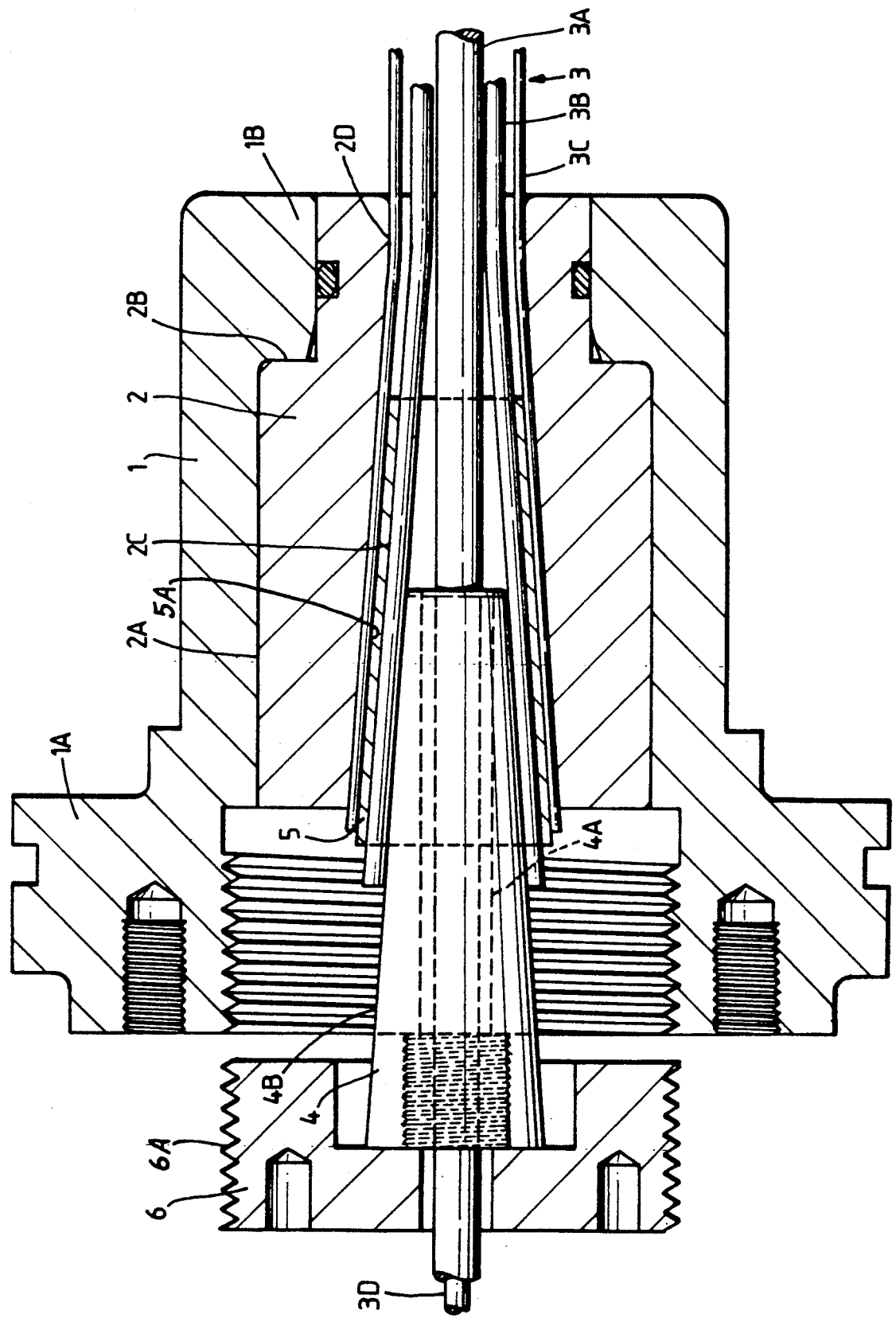

CABLE ANCHORAGE

BACKGROUND OF THE INVENTION

1. Field of the Invention

This invention relates to a cable anchorage, particularly for anchoring a submarine cable to a submersible housing such as a splice chamber or the like, but not exclusively so.

2. Discussion of the Prior Art.

Pat. application WO 8704573 discloses a cable termination suitable for a submarine telecommunications cable. It teaches that where a submarine telecommunication cable is concerned, tensile load-bearing elements are present as one or more annular layers of wires, wound helically along the cable. For example, shallow water telecommunications cables are generally provided with armour wires for protection against damage by trawlers. These armour wires between them may have to take tensile loads of the order of 100 tons if a trawler should pick up a cable in error. At a repeater housing loads of up to for instance 3 tons may have to be borne by the individual wires as the repeater housing is wound onto a cable drum. Hence any clamp assembly used in clamping the ends of the armour wires, known in this context as an armour clamp, must be capable of reliably withstanding total loads on the wires of the order of 100 tons and, if used at a repeater housing, of more than 3 tons on individual wires.

It goes on to describe prior art armour clamps and their problems as follows. It describes a known type of armour clamp comprising a pair of conical rings. The outer ring presents a conical hole, complementary to the exterior of the inner ring. In use, the ends of the armour wires are each fed through the inner ring and bent back over its conical exterior, round the thicker end of its walls. The outer ring is seated on the wires, its conical hole clamping them against the exterior of the inner ring. The outer ring can then be appropriately mounted to anchor the cable as required, for example, to a repeater housing.

This assembly is self-tightening in use. The surface of the conical hole of the outer ring is profiled so as to grip the armour wires while the exterior of the inner ring is smooth. Any tensile load on the armour wires then acts to pull the outer ring towards the thicker end of the inner ring and so tends to increase the clamping effect on the wires themselves, between the two rings. However, unfortunately, the assembly has been found unsatisfactory. The bend produced in each armour wire has led to failure of the clamp owing to shear breakage under unacceptably low tensile loads.

It explains that in order to overcome the problem recognised in the above assembly, a second known type of armour clamp designed to operate without requiring the armour wires to be bent, is described in British Pat. GB No. 2122245. In this assembly, a rigid sleeve is inserted under the straight ends of the armour wires. Coaxial rings having complementary conical surfaces are again used but, in this case, both conical surfaces are smooth and the inner ring is in four separate segments, divided along radial planes of the ring.

The segments of the inner ring are mounted on the armour wires over the rigid sleeve, and the outer ring is then mounted over the segments.

In this second type of armour clamp, which is again self-tightening, when tensile load is applied to the armour wires the tow rings are loaded such that the inner ring is pulled towards the end of the outer ring having the narrower opening. The segments of the inner ring are thereby clamped more tightly onto the armour wires, against the rigid internal sleeve.

Although the second type of armour clamp has been found to offer acceptable reliability at loads of up to 82 tons on the armour wires, it also has drawbacks, including cost, owing to the number of components involved, and the need to insert the rigid sleeve under the straight ends of the armour wires. This means that the diameter of parts of the cable which lie within the armour wires must be reduced to give access for the rigid sleeve.

A further problem, common to known forms of armour clamp, particularly for submarine cables, is related to the techniques required for their installation.

Conventionally, such clamps are mounted, and the clamping forces provided, by a circumferential ring of bolts. Initially, the practice is to tighten these bolts evenly to a controlled maximum tension, selected according to the loads expected in use. The clamp components are thereby settled-in and the likely extent of any movements in the clamp components when in use is consequently reduced.

However, it is known that to maintain the cable armour under such maximal stress can lead to accelerated local deterioration of the armour, particularly from salt water corrosion for example. Therefore, the tension is normally relieved by subsequently loosening the bolts and then tightening them to a final installation tension slightly lower than the original maximum applied tension. This two-stage mounting process, requiring balanced tightening of the bolts using a torque wrench, is clearly laborious and time-consuming.

The clamp assembly which is the subject of the aforementioned WO 8704573 has advantages over the prior art referred to but the preferred embodiment described also has a drawback. The roughening comprises circumferential corrugations on the outer surface at the first ring. If the wires are high tensile steel wires then they are of a relatively hard steel. Such wires are used for the central strength member of the submarine cable such as is described in our British Pat. No. 1550588, whereas any additional armour wires applied on the outside of the cable will normally be of lower strength material such as mild steel (but of larger overall cross section and therefore of substandard strength).

Where it is desired to clamp to high tensile wires then the corrugations need to be of a harder material than the wires, otherwise the wires will 'blunt' the corrugations, thereby substantially reducing the grip of the clamp assembly. It is possible to harden the corrugations by, e.g. a case-hardening technique, but this can be unreliable, and the hardened points can crack under load.

SUMMARY OF THE INVENTION

According to the present invention there is provided a clamp assembly for a wire tensile strength member comprising first and second clamping parts for clamping between them the wire member, means for holding the parts clamped together, at least one of the parts having a clamping surface roughened by grit firmly held on said surface and harder than the material of the wire member.

According to another aspect of the present invention there is provided a clamp assembly for an annular tensile strength member formed of a plurality of wires, said assembly comprising housing parts defining a through-hole with an axially tapered surface, a hollow circular ferrule insert having an axially tapered outer surface, a ferrule insert retaining means adapted for retaining said insert in said hole such that the surface of the hole and said outer surface taper in the same direction, wherein at least one of said tapered surfaces has hard grit bonded thereto and uniformly distributed over said at least one surface.

Preferably the particles are tungsten carbide particles which are particularly suitable for high tensile steel wires. Preferably the design of the termination is such that the clamping member is made of a softer material than the wires, e.g. mild steel, and becomes deformed to adopt at least partically the shape of the strength member wires.

In this way the strength member wires do not themselves become deformed other than tiny impressions which are made in the wires by the particles. But the wires do not become deformed from their original cross section by being squashed. So if they are of originally circular cross section they stay circular in the termination but the clamping part or parts become deformed by having small part-cylindrical indentations formed by the wires. The wires need not be of circular cross section; they can be of non-circular cross section.

BRIEF DESCRIPTION OF THE DRAWINGS

In order that the invention can be clearly understood, reference will now be made to the accompanying drawing which shows in axial cross section a cable anchorage according to an embodiment of the present invention.

DESCRIPTION OF THE PREFERRED EMBODIMENTS

Referring to the drawing the anchorage (clamp assembly) comprises a cylindrical housing 1 having an outer annular shoulder 1A to transfer the axial load applied to the anchorage in use to a casing or other structure, and an inner annular shoulder 1B to receive the axial load from the outer clamping part 2 of the clamp. Part 2 is in the form of a liner having a cylindrical outer surface 2A which fits in the housing 1, an annular shoulder 2B which transfers axial load to the housing 1 and an inner circular tapered surface 2C which in this embodiment is a conical taper having an angle of about four degrees with the central axis. A short cylindrical bore 2D merges smoothly with the tapered surface 2C.

The anchorage is shown assembled on to a submarine optical fibre cable indicated generally at 3. The cable 3 is similar in construction to the one disclosed in British Pat. No. 1550588, and comprises a pressure tube 3A closely surrounded by a first layer 3B and a second layer 3C of high-tensile strength wires. The first layer 3B comprises fourteen wires of 1.71 mm diameter, larger than those of the layer 3C, comprising thirty four wires of 0.94 mm diameter. Within the pressure tube 3A, which can be of copper and which in the embodiment described in 1550588 is a closed, longitudinally split 'C' section and is a thick walled tube, is an optical fibre package 3D. This package extends with the tube 3A through a bore 4A of a circular ferrule insert 4 forming another clamping part.

The insert 4 is shown partially inserted into the first layer 3B of high tensile wires so that they lay splayed out on the tapered surface 4B of the insert.

In between the layers of wires is a conically tapered circular load-bearing intermediate insert 5 whose surfaces are also tapered at about 4 degrees to be complimentary to the co-operating surfaces 4B and 2C.

In assembling the parts on to the cable, first the housing 1 is slid over the cable from left to right in the figure with the liner 2 in place in the housing. Then the intermediate insert 5 is introduced between the layers of wires to the position shown.

Then the ferrule insert 4 is slid along the pressure tube 3A underneath the wires 3B to the position shown. This ferrule insert is then pressed further into the liner 2 by means of an hydraulic press giving an axial force of about eight tons. This shifts the ferrule insert inwards about another 13 to 15 mm so that a ferrule insert retaining nut 6 having an outer thread 6A can engage the internal thread 1C of the housing 1, whereby the ferrule insert can be locked in the liner 2 and thus clamp the wires 3B and 3C in the clamp assembly.

The material of the ferrule insert 4 is of hard steel, typically EN24, but not as hard as the high tensile wires. The surface 4B of the ferrule has previously been coated with tungsten WC grit which has been brazed, glued or otherwise attached to the surface in an even distribution.

Similarly the inner surface 2C of the liner 2 has also been coated with tungsten carbide WC grit. Alternatively the outer surface 5A of the intermediate insert 5 is coated with the grit by brazing, glueing etc. The liner 2 is made of mild steel and the intermediate insert 5 is also of mild steel. Thus each strength member wire layer 3B and 3C engages a surface of the clamp which has the grit bonded to it. We believe one surface only is necessary for each layer.

It is found that the grit becomes embedded both in the wires and in the surface to which the grit is bonded and the grit size is in the range up to 300 $\mu$m, for the larger wires. For the smaller wires then a smaller grit size eq up to 150 $\mu$m would be used, and in any event the assembly is such that the depth to which the grit becomes embedded in the wires does not become excessive such that the wire strength is not impaired. In this embodiment the indentation depth is set to be not greater than 5% of the wire size or diameter (circular wire).

The surfaces of the insert 5 and the surface 2A of the liner 2 becomes deformed to the shape of the wires which in this embodiment are circular, to that semi-circular cylindrical indentations are made.

We have discovered that this grit provides an exceptionally strong locking mechanism and enables the anchorage to be greatly simplified over previous designs referred to in the prior art. In particular both the ferrule 4 and the liner 2 can each be made as unitary piece parts, whereas in the prior art the outer clamping part, equivalent to the liner 2, is made of several segments which can be radially, squeezed together to cause the gripping action.

Because in this embodiment the layers of wires 3B and 3C are contra-laid, the intermediate insert is necessary otherwise the clamping forces may cause the larger wires to tend to 'cut' the smaller wires thereby reducing the strength of the smaller wires. If the wires have the same angle and direction of lay then the liner 5 could be omitted.

Also the clamp assembly is suitable for a cable with a single layer of tensile strength member wires, in which case the intermediate insert would not be required.

Futhermore although in the embodiment described there are two surfaces which are roughened by coating with tungsten carbide grit, it would be possible to have only one surface so roughened, particularly where only one layer of high tensile wires exists.

A particularly effective roughened surface using tungsten carbide grit is formed by a brazing method similar to that used to make a commercially available product called 'Abradafile'. This is intended for use solely as an abrasion tool for filing down stone and metal work pieces, or even wood and is made by C4 Carbide of Cambridge, England. We believe it to be manufactured as follows; the substrate is wetted by heating the surface to around 1000 deg.C and applying cobalt to the surface and evenly sprinkling tungsten carbide grit onto the surface, the grit having also been pre-wetted with cobalt. This bonds the grit very firmly by a braze to the surface of the substrate which is normally mild steel. Other brazes may however be used.

The embodiment described is suitable for use with a splice chamber or repeater where two such anchorages would be required, one at each end of the chamber or repeater.

In the case of a splice chamber used with a shallow water cable, the cable would have outer armour wires for protection against trawler damage, and these wires are separately anchored around the outside of the sealed splice chamber and subsequent to the anchoring of the strength member wires by means of the embodiment described.

The anchorages are retained in the splice chamber or repeater against tensile force by the shoulder 1A.

What is claimed is:

1. A clamp assembly for a wire tensile strength member comprising first and second clamping parts for clamping between them the wire member, means for holding the parts clamped together, at least one of the parts having a clamping surface roughened by grit firmly honed to said surface and harder than the material of the wire member.

2. An assembly as claimed in claim 1 wherein the grit is tungsten carbide.

3. An assembly as claimed in claim 1, wherein the grit size lies in the range 0-300 μm.

4. The combination of a wire tensile strength member clamped in a clamp assembly as defined in claim 1, wherein the grit forms indentations in the wires of the strength member, said indentations having a size not exceeding 5% of the diameter of the wires.

5. An assembly as claimed in claim 1 wherein said parts have co-operating tapered surfaces arranged so that tensile force applied to the clamped wire member and restrained by the clamp assembly will tend to increase the clamping force by the action of the taper.

6. An assembly as claimed in claim 5 wherein the grit is tungsten carbide.

7. An assembly as claimed in claim 5, wherein said grit is brazed to said surface.

8. An assembly as claimed in claim 7 where the grit is tungsten carbide.

9. A clamp assembly for an annular tensile strength member formed of a plurality of wires, said assembly comprising housing parts defining a through-hole with an axially tapered surface, a hollow circular ferrule insert having an axially tapered outer surface, a ferrule insert retaining means adapted for retaining said insert in said hole such that the surface of the hole and said outer surface taper in the same direction, wherein at least one of said tapered surfaces has hard grit bonded thereto and uniformly distributed over said at least one surface.

10. A method of clamping a wire tensile strength member to a clamp assembly comprising first and second clamping parts, at least one of said parts having a clamping surface roughened by grit firmly honed to said surface and harder than the material of the wire member, said method comprising introducing said wire member between said parts and moving the parts relative to each other to clamp the member between said parts and so that the grit becomes at least partially embedded in the wire member.

11. A method as claimed in claim 10 wherein said wire member has a longitudinal axis and wherein said parts are each tapered at a small angle to said axis, said method including the step of causing relative movement axially between said parts such that the taper causes an increase in the clamping force normal to the clamping surfaces.

* * * * *